(12) United States Patent
Mehta et al.

(10) Patent No.: US 7,895,192 B2
(45) Date of Patent: Feb. 22, 2011

(54) ESTIMATING THE LOADED EXECUTION RUNTIME OF A DATABASE QUERY

(75) Inventors: Abhay Mehta, Austin, TX (US); Chetan K. Gupta, Austin, TX (US); Umeshwar Dayal, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 623 days.

(21) Appl. No.: 11/880,392

(22) Filed: Jul. 19, 2007

(65) Prior Publication Data

US 2009/0024572 A1   Jan. 22, 2009

(51) Int. Cl.
G06F 7/00    (2006.01)
G06F 17/30   (2006.01)

(52) U.S. Cl. .................................. 707/719; 707/797
(58) Field of Classification Search ............... 707/2, 707/3, 718, 719, 999.003, 706, 713, 797
See application file for complete search history.

(56) References Cited

U.S. PATENT DOCUMENTS

| | | | |
|---|---|---|---|
| 5,694,591 A * | 12/1997 | Du et al. | 707/999.002 |
| 5,701,461 A * | 12/1997 | Dalal et al. | 707/999.003 |
| 6,026,390 A * | 2/2000 | Ross et al. | 707/999.002 |
| 6,275,818 B1 * | 8/2001 | Subramanian et al. | 707/999.003 |
| 6,581,055 B1 * | 6/2003 | Ziauddin et al. | 707/999.003 |
| 7,051,034 B1 * | 5/2006 | Ghosh et al. | 707/718 |
| 7,184,998 B2 * | 2/2007 | Nica | 707/999.002 |
| 2003/0018618 A1 * | 1/2003 | Bestgen et al. | 707/3 |
| 2003/0172059 A1 * | 9/2003 | Andrei | 707/3 |
| 2005/0071331 A1 * | 3/2005 | Gao et al. | 707/4 |
| 2005/0138073 A1 * | 6/2005 | Zhou et al. | 707/104.1 |
| 2005/0187907 A1 * | 8/2005 | Wortendyke et al. | 707/3 |
| 2005/0192937 A1 * | 9/2005 | Barsness et al. | 707/3 |
| 2006/0031189 A1 * | 2/2006 | Muras et al. | 707/2 |
| 2006/0122993 A1 * | 6/2006 | Dettinger et al. | 707/4 |
| 2008/0270346 A1 * | 10/2008 | Mehta et al. | 707/2 |
| 2009/0006045 A1 * | 1/2009 | Liu et al. | 703/2 |
| 2009/0024563 A1 * | 1/2009 | Sengar | 707/2 |

* cited by examiner

*Primary Examiner*—John E Breene
*Assistant Examiner*—Phong Nguyen

(57) ABSTRACT

In a method for estimating a loaded execution runtime of database query, a database query for a database is received for a loaded database. Load information for the database is received. A prediction of query runtime tree is accessed. The prediction of query runtime tree is built from historical query information regarding historical database queries previously executed on the database. The prediction of query runtime tree includes a classifier function adjusted for an historical impact of loading of the database. The database query is processed through the prediction of query runtime tree, such that a loaded execution runtime of the database query is estimated based upon information pertaining to historical database queries similar to the database query.

19 Claims, 5 Drawing Sheets

400

```
┌─────────────────────────────────────────────────┐
│  RECEIVE HISTORICAL QUERY INFORMATION REGARDING │
│  A GROUP OF HISTORICAL DATABASE QUERIES         │
│  PREVIOUSLY EXECUTED ON A LOADED DATABASE.      │
│                      410                        │
└─────────────────────────────────────────────────┘
                         │
                         ▼
┌─────────────────────────────────────────────────┐
│  DETERMINE FEATURE VECTORS FOR A PLURALITY OF   │
│  THE HISTORICAL DATABASE QUERIES, SUCH THAT THE │
│  FEATURE VECTORS COMPRISE LOAD ATTRIBUTES       │
│  RELATED TO THE IMPACT OF DATABASE LOADING UPON │
│  THE PLURALITY OF HISTORICAL DATABASE QUERIES.  │
│                      420                        │
└─────────────────────────────────────────────────┘
                         │
                         ▼
┌─────────────────────────────────────────────────┐
│  USE MACHINE LEARNING TO BUILD A PREDICTION OF  │
│  QUERY RUNTIME TREE, SUCH THAT NODE ELEMENTS    │
│  AND LEAF ELEMENTS OF THE PREDICTION OF QUERY   │
│  RUNTIME TREE CORRESPOND TO QUERY EXECUTION     │
│  RUNTIME RANGES ASSOCIATED WITH SETS OF THE     │
│  PLURALITY OF HISTORICAL DATABASE QUERIES.      │
│                      430                        │
└─────────────────────────────────────────────────┘
                         │
                         ▼
┌─────────────────────────────────────────────────┐
│  DEVELOP A CLASSIFIER FUNCTION FOR A NODE       │
│  ELEMENT OF THE PREDICTION OF QUERY RUNTIME     │
│  TREE, THE CLASSIFIER FUNCTION DEVELOPED FROM   │
│  AT LEAST ONE ATTRIBUTE OF FEATURE VECTORS OF   │
│  A SET OF THE PLURALITY OF HISTORICAL DATABASE  │
│  QUERIES ASSOCIATED WITH THE NODE, THE          │
│  CLASSIFIER FUNCTION CONFIGURED FOR SELECTING   │
│  A BRANCHING PATH FOR PROCESSING A DATABASE     │
│  QUERY THROUGH THE PREDICTION OF QUERY RUNTIME  │
│  TREE TO ESTIMATE A LOADED EXECUTION RUNTIME    │
│  OF THE DATABASE QUERY.                         │
│                      440                        │
└─────────────────────────────────────────────────┘
```

FIG. 4

ESTIMATING THE LOADED EXECUTION RUNTIME OF A DATABASE QUERY

TECHNICAL FIELD

Embodiments of the present technology relate to database information. More specifically, embodiments of the present technology relate to using historical query information in estimating the loaded execution runtime of a database query.

BACKGROUND

An optimizer is located in or is part of a compiler of a database. Generally speaking, the optimizer compiles a received query into a plan, called a plan of execution or "query plan." The optimizer then examines several different potential plans of execution for each query. For each of the examined plans the optimizer generates a cost based upon a costing model internal to the optimizer, so that it can choose the plan with the least amount of cost as the means for executing the query.

The execution cost is typically determined in a very analytical way. Generally speaking, the optimizer divides a database query into its operations and sub-operations, and determines from a cost model how many resources will be used to execute each operation and sub-operation. The optimizer then determines a sum of these incremental execution costs to determine the overall execution cost for a query. The execution cost is typically a unitless number which represents a cost in terms of resource utilization. Generally, the optimizer chooses to execute a query plan with the lowest calculated execution cost. Though not guaranteed, one goal of this selection method is that an query plan with a lower execution cost will likely execute the database query more quickly than an query plan with a higher execution cost.

User's typically desire some estimate of the runtime that it will take for a query to execute, not just a goal that one query plan will likely execute more quickly than another. There are a variety of reasons for this. For example, by having an estimate of the query runtime, a user (or a system) can more effectively manage the workload of a database. That is, decisions can be made such as: how many queries to perform at once; what order the queries should be performed in; and how to load balance the database system. Additionally, if a user knows that a query will take a long time, he may take an action, such as: reformatting the query, not executing the query, or deciding to do something with his time while the query is executing. Thus, the more accurate an estimate is, the better it can be utilized for planning and managing purposes While the execution cost is a fairly accurate predictor of relative execution cost (in terms of resource utilization costs) for choosing among a variety of query plans, it is not an accurate mechanism for estimating the runtime that a particular query is likely to take to execute. Generally speaking, execution runtimes estimated from an execution cost are not very reliable and often vary widely when compared to actual execution runtimes. Moreover, the more loaded a database (i.e., the more queries it is simultaneously executing), the longer a query will typically take to execute. Wide variability and unpredictably long execution times are especially a concern in database systems such as Enterprise Data Warehouses where wide variations in the loading cause execution runtimes of even identical queries to vary widely. This variability of execution runtimes causes difficulties in management of database workload and/or in user decisions with respect to database queries. Though some products do exist to predict query runtimes, these products are typically specific to a particular database and do not give consideration to the loading of a database when predicting the execution runtime of a query.

BRIEF DESCRIPTION OF THE DRAWINGS

The accompanying drawings, which are incorporated in and form a part of this specification, illustrate embodiments of the present technology for estimating the loaded execution runtime of a database query and, together with the description, serve to explain principles discussed below:

FIG. 4 is a flow diagram of an example method for building a prediction of query runtime tree for estimating the loaded execution runtime of a database query, according to one embodiment.

Figure 1:
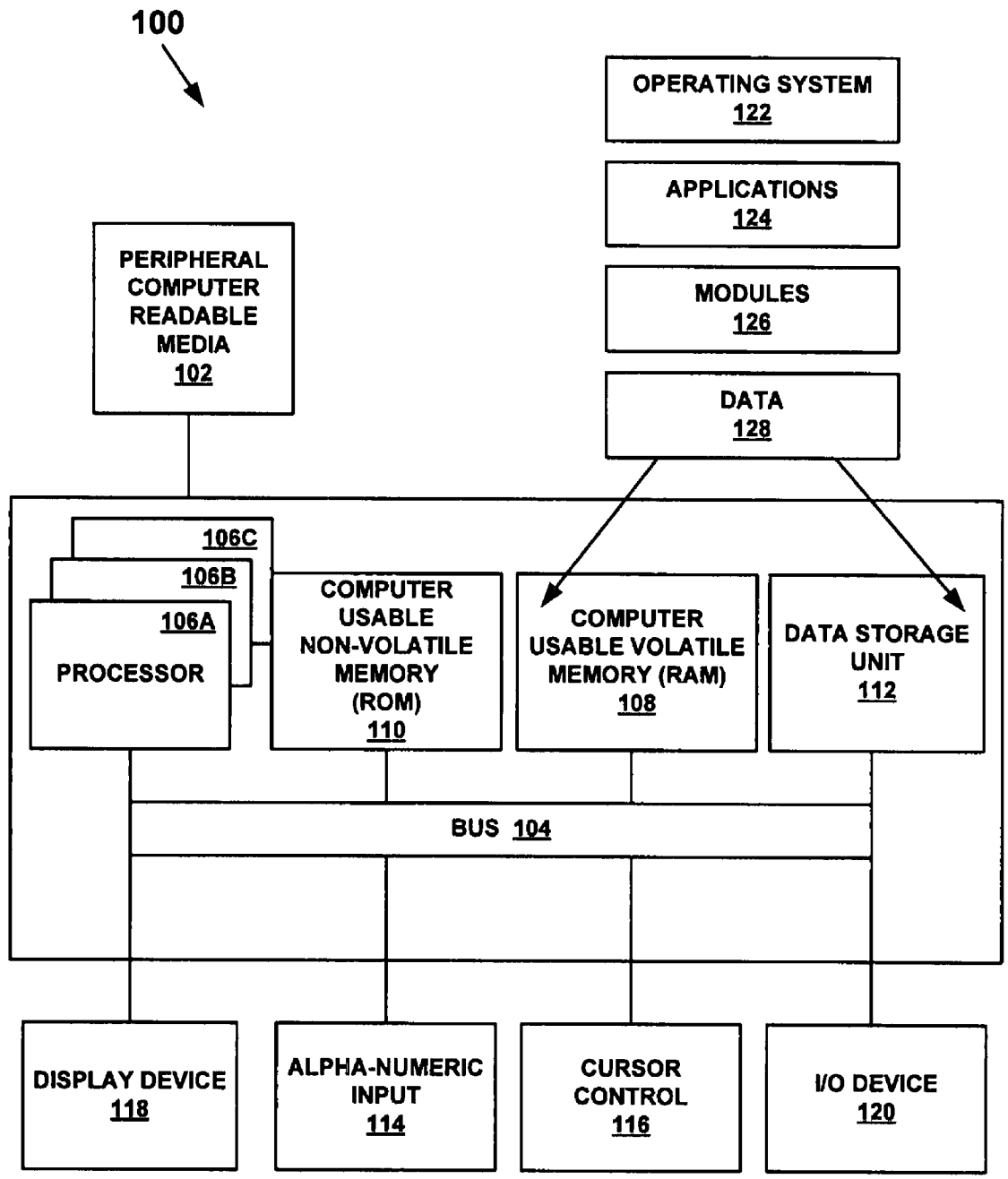
FIG. 1 is a diagram of an example computer system used in accordance with embodiments of the present technology.

The drawings referred to in this description should not be understood as being drawn to scale unless specifically noted.

DETAILED DESCRIPTION

Reference will now be made in detail to embodiments of the present technology for estimating a loaded execution runtime of a database query, examples of which are illustrated in the accompanying drawings. While the subject matter is described in conjunction with various embodiments, it will be understood that they are not intended to limit the present technology to these embodiments. On the contrary, the present technology is intended to cover alternatives, modifications and equivalents, which may be included within the spirit and scope the various embodiments as defined by the appended claims. Furthermore, in the following detailed description, numerous specific details are set forth in order to provide a thorough understanding. However, the present technology may be practiced without these specific details. In other instances, well known methods, procedures, components, and circuits have not been described in detail so as not to unnecessarily obscure aspects of the subject matter being described.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the described arts to most effectively convey the substance of their work to others skilled in their art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system.

Unless specifically stated otherwise as apparent from the following discussions, it is appreciated that throughout the present detailed description, discussions utilizing terms such as "receiving", "accessing", "processing", "extracting", "determining", "traversing", "using", "utilizing", "developing", "terminating", "grouping", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

The present technology is also well suited to the use of other computer systems such as, for example, optical and virtual computers. Additionally, it should be understood that in embodiments of the present technology, one or more of the steps can be performed manually.

Overview of Discussion

Modern databases and Enterprise Data Warehouses often have complex workloads that change dynamically and are difficult to manage. One of the missing pieces is an accurate estimate of how long a query will take to execute on a loaded database (i.e., a database that is also executing one or more other queries).

The technology described herein provides non-database specific methods and systems for estimating the loaded execution runtime of a database query. The approach is based upon the concept that similar database queries operating under similar load conditions take a similar amount of time to execute. Generally speaking, the technology described herein takes the optimizer cost and other features of a database query, combines these features with the load information to determine a load vector for a database query, and compares the resulting attributes of the features and the load vector with historical query information to predict the loaded execution runtime of the database query.

Thus by comparing certain attributes of a new query to attributes of similar historical queries which have been executed on the database under similar load conditions, a fairly accurate prediction of the execution runtime of the new query can be made. The technology described herein, makes this comparison by processing the new database query through a prediction of query runtime tree that has been constructed of historical database queries and load information associated with the historical database queries.

Discussion will begin with a description of an example computer system environment with which, or upon which, embodiments of the present technology may operate. Discussion will proceed to a description of an example system for estimating a loaded execution runtime of a database query. Components of this system will be generally described. Operation of this system and its components will then be described in conjunction with discussion of an example method for building a prediction of query runtime tree and further described in conjunction with discussion of an example method for estimating the loaded execution runtime of a database query. An example of a prediction of query runtime (PQR) tree will be discussed in conjunction with these methods in order to promote the understanding of the present technology.

Example Computer System Environment

With reference now to FIG. 1, portions of the present technology are composed of computer-readable and computer-executable instructions that reside, for example, in computer-usable media of a computer system. That is, FIG. 1 illustrates one example of a type of computer that can be used to implement embodiments, which are discussed below, of the present technology. FIG. 1 illustrates an example computer system 100 used in accordance with embodiments of the present technology. It is appreciated that system 100 of FIG. 1 is an example, and that the present technology can operate on or within a number of different computer systems including general purpose networked computer systems, embedded computer systems, optical computer systems, virtual computer systems, database systems, server devices, client devices, various intermediate devices/nodes, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors.

System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive or solid state storage unit) coupled to bus 104 for storing information and instructions.

System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 may be a liquid crystal device, cathode ray tube, plasma display device or other display device suitable for creating, presenting, or displaying graphic images and/or symbols or alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick, directional and input keys on a multimedia remote control, or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In some embodiments, the present technology is stored, for example, as an application 124 or module 126 in memory locations within RAM 108, computer readable media within data storage unit 112, and/or peripheral computer readable media 102.

System for Estimating a Loaded Execution Runtime Of a Database Query

Figure 2:
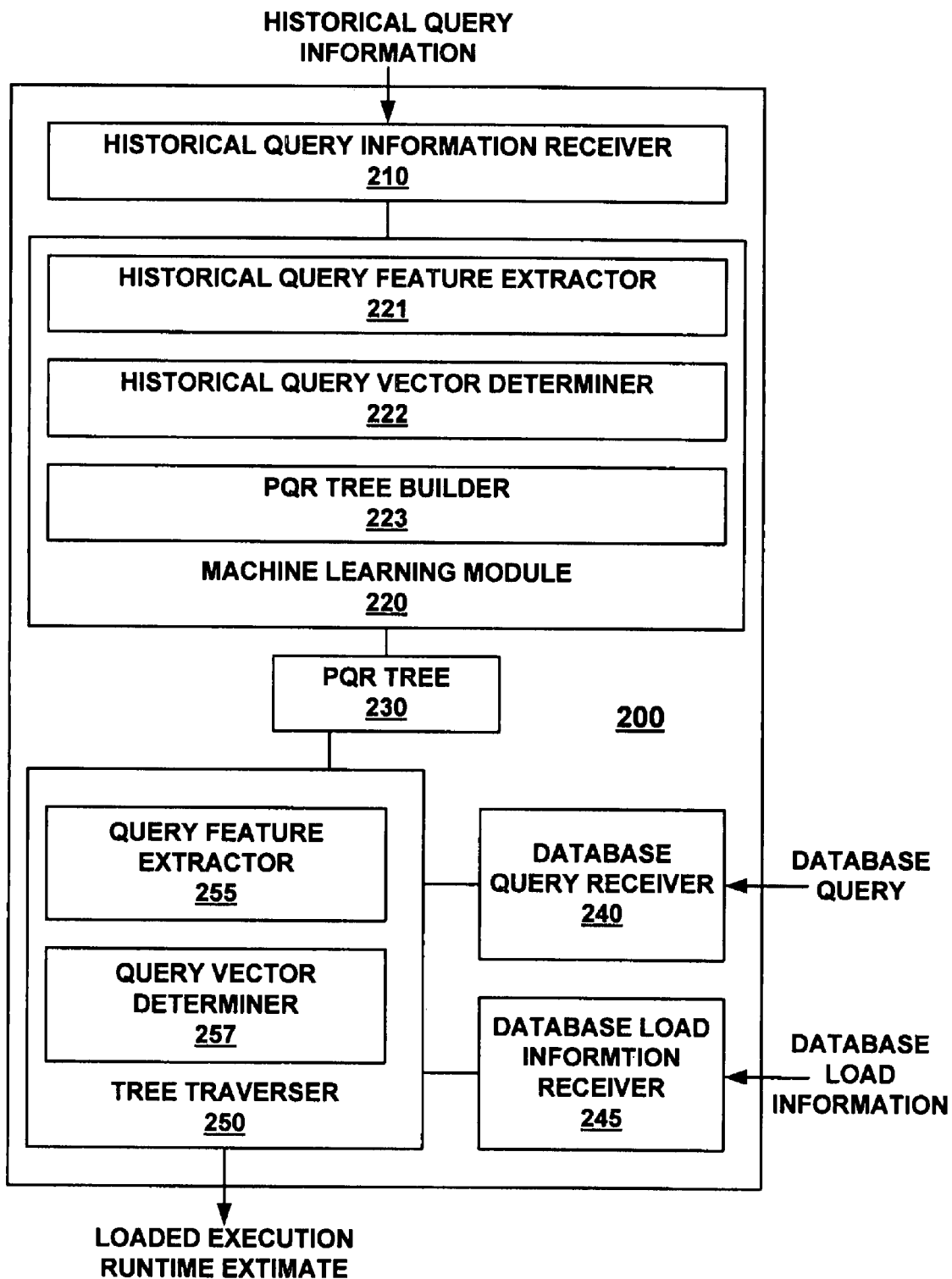
FIG. 2 is a block diagram of an example system for estimating a loaded execution runtime of a database query, according to various embodiments.

With reference now to FIG. 2, a block diagram is shown of a system 200 for estimating a loaded execution runtime of a database query. It is appreciated that system 200 illustrates one example embodiment, and that other configurations within the scope of the present technology are possible. As shown in FIG. 2, system 200 is comprised of an historical query information receiver 210, a machine learning module 220, a prediction of query runtime (PQR) tree 230, a database query receiver 240, a database load information receiver 245, and a tree traverser 250.

Historical query information receiver 210 is configured for receiving historical query information to be processed by machine learning module 220 into a PQR tree, such as PQR tree 230. Such historical information may comprise a set of database queries, corresponding database query plans which have been executed on a particular database system, corresponding actual execution runtimes of the database queries on a database, and load information describing the load of the database when one or more of the database queries was executed on the database. For example, the historical query information may comprise a set of queries on a database during the past week, month, year, or some other time interval. Other information such as load information, execution runtimes, and corresponding query plans for the set of queries may be included in the historical query information. It is appreciated that in some embodiments the historical query information may be updated or changed periodically, such as weekly or monthly.

Machine learning module 220 is coupled with historical query information receiver 210. Machine learning module 220 is configured for automatically developing one or more query execution runtime classifier functions from the historical query information supplied by historical query information receiver 210. One or more of such query execution runtime classifier functions are then embodied by (within the structure of) a prediction of query runtime tree, such as PQR tree 230. In one embodiment, as shown in FIG. 2, machine learning module 220 is comprised of historical query feature extractor 221, historical query vector determiner 222, and PQR tree builder 223.

Machine learning module 220 utilizes historical query feature extractor 221 to extract at least one historical query feature related to an historical database query of the historical query information. It is appreciated that historical query feature extractor typically extracts numerous historical query features from each of a plurality of historical queries. As part of this extraction, historical query feature extractor 221 parses an historical database query and/or a query plan corresponding to the historical database query.

During the parsing, the historical database query and/or historical query plan are decomposed into one or more pre-identified query features that historical query feature extractor 221 has been instructed to search for and extract. A non-limiting example list of some such query features includes: a measure of bushiness, a measure of disk partition parallelism, a total input/output cardinality, an input/output cost, a measure of process parallelism, a total join cardinality, a non-input/output cost, a total number of inputs/outputs, a total number of joins, a total number of probes, a total number of sorts, a total cardinality of sorts, a total number of tables, an optimizer cost, a total estimated cardinality, a total number of operators, and a total operator cost.

With respect to this example list of query features, the following descriptions apply.

Bushiness of query tree corresponds to the query tree developed by a database optimizer as part of a query plan corresponding to a database query. Bushiness is a ratio that is a measure of the shape and structure of the query tree. For example, is the query tree a straight line or does it have a large number of nodes and leaves. Each node in a query plan can have one child or two children. Bushiness of the query tree is determined in one embodiment, by taking a ratio of the number of nodes that have two children divided by the total number of nodes. This ratio gives the measure of the bushiness.

Disk partition parallelism is defined as the number of different disks that a query plan is getting data from. A number of disk volumes (logical disks) are typically controlled by a single process. The number of these processes constitutes a measure of disk partition parallelism. It is appreciated that a logical disk may be comprised of a number of physical disks.

Total input output cardinality corresponds to the number of records retrieved during the input/output operations performed by operations of a database query.

Input/output cost refers to total of the costs related to input/output operations associated with a disk.

Process parallelism corresponds to the number of parallel processes spawned by a database query. Each operator can spawn a number of processes to conduct work more quickly. By adding up the number of parallel processes that an operator divides it self into, a measurement of process parallelism is achieved.

Total join cardinality corresponds to the number of entries in the joined tables that are joined by a database query.

Non-input/output cost refers to total of the costs not related to input/output operations associated with a disk. These costs are things such as processor cost, message cost, and costs for other functions that a database system is performing as part of a query plan, but which are not related to the actual input and output of data.

Total number of input/output operations corresponds to the total number of storage accesses to be performed by operations in a database query.

Total number of joins corresponds to the sum of the number of joins between tables (and/or within a single table) that are contained in a database query.

The number of probes is related to the manner in which joins are performed. There are typically two sides of a join, where records on one side of join are attempted to be matched with records on the other side of the join. Consider two tables, one on the left and one on the right. A probe is used when an attempt is made to match records from, for example, the left table to records of the right table. Hash table(s) are typically used in this process. The database system repeatedly probes the hash table(s) to determine how many matches to the left table occur in the right table. The number of probes is the number of times that the database probes into the hash table.

Total number of sorts corresponds to the sum of the number of "sorting" operations performed by a database query.

Total sort cardinality corresponds to the number of items in a table or list of items that is being sorted by a database query. In an instance where a list of 100 names is being sorted, the sorting cardinality is 100. Thus, the total of items in all tables being sorted by a database query gives the total sort cardinality.

Total number of tables (table count) corresponds to the sum of the number of tables accessed by a particular database query.

An optimizer cost represents the execution cost provided by a database optimizer, for example as part of a query plan.

Total cardinality corresponds to the number of records processed by a particular historical database query. Thus for each operator in a database query, the number of records processed is summed to determine total estimated cardinality.

The total number of operators corresponds to the summation of the operators that comprise a particular database query.

The total operator cost corresponds to the summation of the individual operator costs of each operator within a particular database query. Such information may be parsed from a query plan associated with a particular database query.

With continued reference to FIG. 2, historical query vector determiner 222 determines both a query plan vector and a system load vector for one or more historical database queries that will be used to build a PQR tree. A query plan vector is made up of one or more of the query features that are extracted by historical query extractor. A system load vector for an historical query is made up of system load information such as a measure of the number of queries running on a loaded database when the historical query was executed. This number of queries is referred to herein as an MPL (Multi-Programming Level).

The system load vector is also made up of a measure of the number of processes that were running on the database when a particular historical query was executed (each query may be comprised of multiple processes). Additionally, both an average MPL (for a group of queries being analyzed for use in a PQR tree) and the measure of the number of processes (for an individual query) can be combined, such as through multiplication with extracted query features. Such combining stretches or adjusts the extracted query features to represent the effect of longer runtimes associated with database load. Thus, the higher the MPL or measure of processes, the greater the stretch of the feature. Selected stretched features are included in the system load vector.

The above mentioned system load vector is based on three observations and assumptions: (1) a query's execution runtime gets stretched because of the contention it experiences; (2) the contention a query experiences is proportional to the MPL experienced by the query; and (3) MPL is a number that is often controlled and/or known by the workload manager of a database system, and therefore is a good number to use in modeling the future load on a database system.

In one embodiment, historical query vector determiner 222 also determines a feature vector for the database query by combining selected attributes of the query plan vector and selected attributes of the system load vector. For example, in one embodiment, a feature vector for an analyzed database query is comprised of the 17 extracted query features described above, a stretched cost (total cost*MPL), a stretched process parallelism (process parallelism*MPL), a stretched operator cost (total operator cost*MPL), a stretched bushiness (bushiness*MPL), a stretched cost II (total cost*number of processes), a stretched process parallelism II (process parallelism*number of processes), a stretched operator cost II (total operator cost*number of processes), a stretched bushiness II (bushiness*number of processes), the number of processes (as described above), and the actual MPL experienced during the execution of the analyzed database query. It is appreciated that in other embodiments, the feature vector for an analyzed database query may have a different composition of attributes.

With continued reference to FIG. 2, PQR tree builder 223 works in conjunction with historical query feature extractor 221 and historical query vector determiner 222, and in one embodiment is coupled both. PQR tree builder 223, groups one or more historical database queries into an element (such as a node element and/or a leaf element) of a binary tree based upon an execution runtime of the historical database query. Thus, for example, all historical database queries that fall within a certain time range, such as two seconds to five seconds to execute, may be grouped together in an element.

A PQR tree, such as PQR tree 230 is designed to comply with certain objectives which are predefined. Table 1, shows a definition used, for example, by PQR tree builder 223 during the building of a PQR tree.

TABLE 1

Example Definition of a PQR tree $T_s$

A PQR Tree, denoted by $T_s$, is a binary tree such that:
1. Every node u of $T_s$ is some 2-class classifier fu.
2. The node u contains examples E (e.g., feature vectors associated with historical database queries), on which the classifier f u is trained.
3. fu is a rule that decides for each new query q with execution runtime tq in [tua ,tub], if q should go to [tua ,tub + $\Delta_u$) or [t ua + $\Delta_u$, t ub], where $\Delta_u$ lies in (0, tua – tub).
4. For every node U of $T_s$, there is an associated accuracy, where accuracy is measured as the percentage of correct predictions made by fu on the example set E.
5. Every node and leaf of the tree corresponds to a time range [tua , tub].

Figure 3:
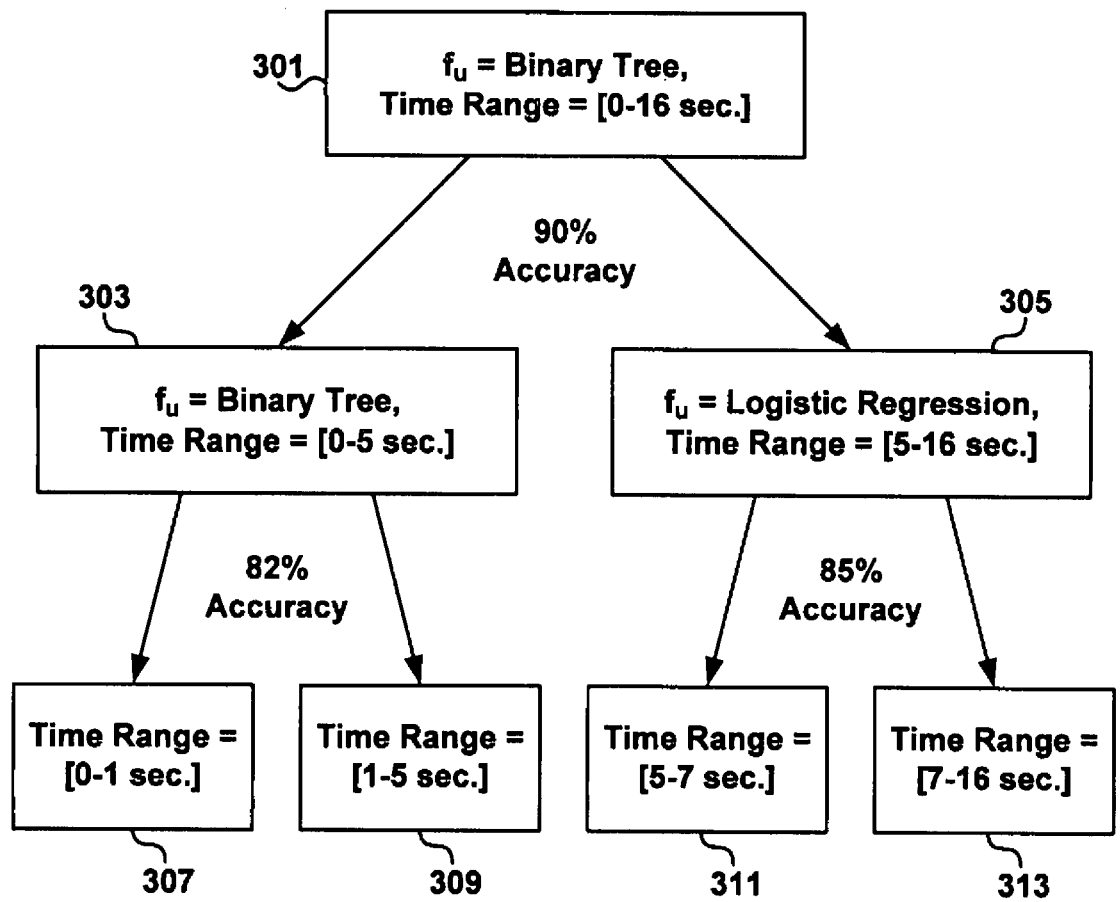
FIG. 3 represents an example prediction of query runtime tree used for estimating the loaded execution runtime of a database query, according to an embodiment.

An example of a very basic PQR tree 230A is shown FIG. 3. PQR tree (Prediction of Query Runtime) tree 230A represents a loaded database query runtime estimator solution set for a given database system, and is based upon a given set of historical database information (which includes historical load information). In one embodiment, PQR tree 230A is created by machine learning module 220. It is appreciated that the shape, structure, and content of PQR tree 203A are presented as an example, and that other such PQR built according to the methods described herein may be larger, smaller, unsymmetrical, and/or more or less bushy. It is also appreciated that other such PQR trees built according to the methods describe herein may have different content, classifier functions, and/or ranges execution runtime ranges associated with node and leaf elements.

Database query receiver 240 receives a database query for which the loaded execution runtime will be estimated. The database query is a query which will be executed or is anticipated to be executed on a database. The concept of receiving a database query also comprises receiving a query plan for the database query. The query plan will have been designed by the optimizer of the database system for which PQR tree 230 has been built to estimate database query times.

Database load information receiver 245 receives load information related to a load of the database on which the received query will be (or is anticipated to be) executed. Some examples of such load information include the present or projected Multi-Programming Level (MPL) of the database (e.g., the number of queries executing on the database), the number of process executing or anticipated to be executing on the database, or some other measure of the load of a database.

Tree traverser 250 is coupled with database query receiver 240. Tree traverser 250 processes the received database query through a PQR tree, such as PQR tree 230, to estimate a loaded execution runtime of the database query. This estimate is based upon information pertaining to execution runtimes and database loads related to historical database queries with similar attributes to the received database query. By loaded execution runtime, what is meant is the time needed to execute the received database query on a database system that is loaded at the level indicated by the received load information.

As shown in FIG. 2, tree traverser 250 is comprised of a query feature extractor 255 and a query vector determiner 257. Query feature extractor 255 extracts one or more features of the received database query. Query feature extractor 255 operates in the same manner as historical query feature extractor 221, to extract the same types query features as previously discussed in conjunction with historical query feature extractor 221. Query vector determiner 257 determines a query plan vector and a system load vector for the received database query. Query vector determiner 257 operates in the same manner as historical query vector determiner 222. Query vector determiner 257 also determined a feature vector for the received query, in the manner previously described in conjunction with historical query vector determiner 222.

Figure 5:
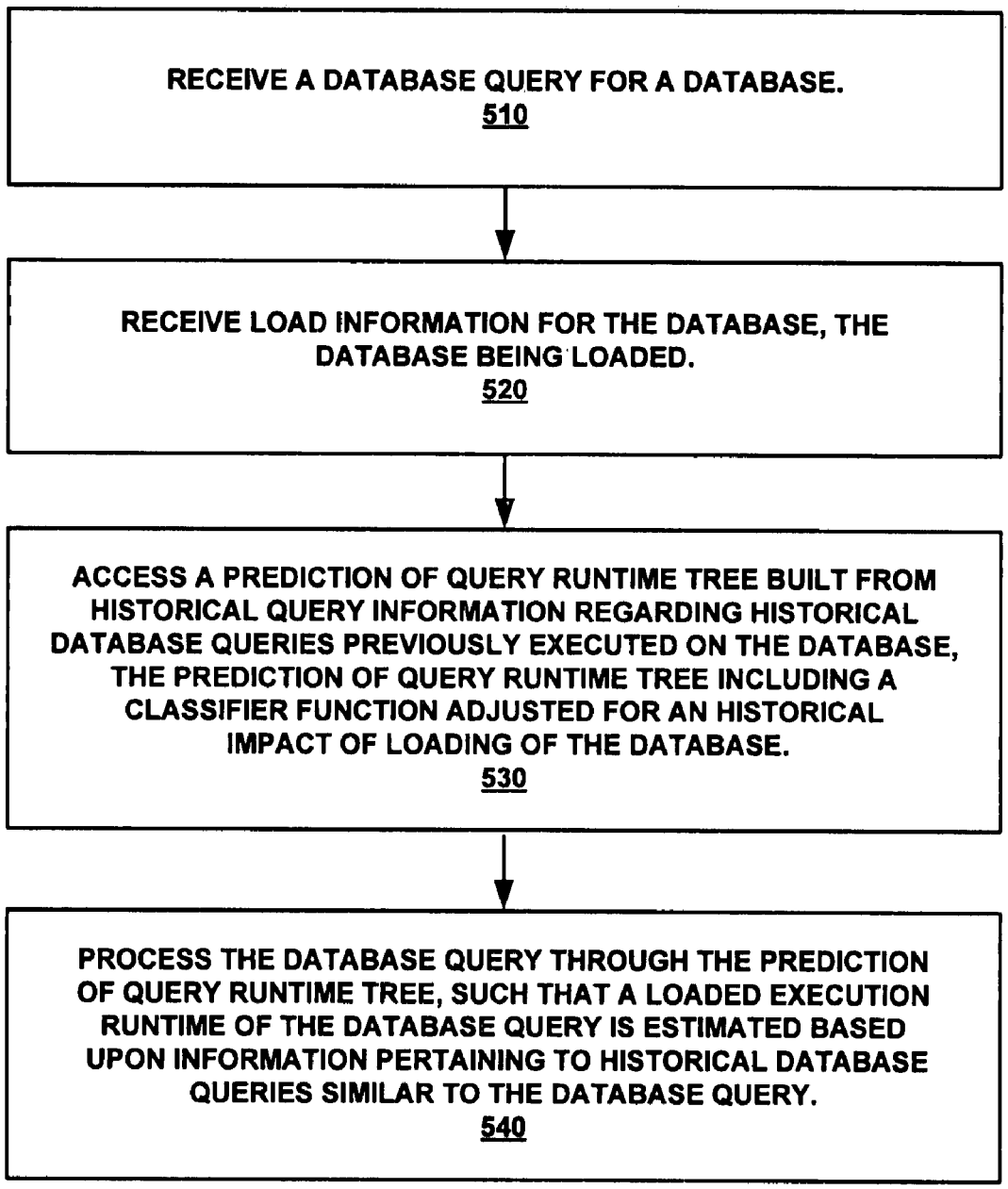
FIG. 5 is a flow diagram of an example method for estimating the loaded execution runtime of a database query, according to an embodiment.

Operation of the Present System for Estimating a Loaded Execution Runtime of a Database Query The following discussion sets forth in detail the operation of present technology through description of example embodiments. With reference to FIGS. 4 and 5, flow diagrams 400 and 500 each illustrate example steps used by methods and/or processes according to various embodiments described herein. Flow diagrams 400 and 500 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 400 and 500, such steps are examples. It is appreciated that embodiments described herein are well suited to performing various other steps or variations of the steps recited, that the recited steps may be performed in an order different than presented, and that not all of the recited steps may be performed in every embodiment.

Building a Prediction of Query Runtime Tree

FIG. 4 is a flow diagram 400 of a method, according to one embodiment, for building a prediction of query runtime (PQR) tree for estimating a loaded execution runtime of a database query. Reference will be made to elements of FIG. 2 and FIG. 3 to facilitate explanation of the operation of flow diagram 400.

At 410 of flow diagram 400, in one embodiment, historical query information is received regarding a group of historical database queries previously executed on a loaded database. This historical information and this group of historical database queries will be used to build and/or test a PQR tree. In one example, such historical query information is received by historical query information receiver 210 of system 200.

At 420 of flow diagram 400, in one embodiment, feature vectors are determined for a plurality of the historical database queries. Such feature vectors comprise load attributes related to the impact of database load upon the plurality of historical database queries. Examples of components of a feature vector have been previously described.

In one embodiment, historical query vector determiner 222 and historical query feature extractor 221 work in concert, as previously described, to produce a feature vector and its constituent parts, a system load vector and a query plan vector. As part of this process, historical query feature extractor 221 extracts a plurality of historical query features from each of the historical database queries which are being used to build the PQR tree. Historical query vector determiner 222 then utilizes a plurality of the historical query features extracted from an historical query to develop a query plan vector for that historical query. This is repeated for the other historical queries which are being used to build the PQR tree.

It is appreciated that a query plan vector may include one or more query features, but typically has numerous query features. The following group provides a non-limiting example listing of some query features which may be included in a query plan vector: a measure of bushiness, a measure of disk partition parallelism, a total input/output cardinality, an input/output cost, a measure of process parallelism, a total join cardinality, a non-input/output cost, a total number of inputs/outputs, a total number of joins, a total number of probes, a total number of sorts, a total cardinality of sorts, a total number of tables, an optimizer cost, a total estimated cardinality, a total number of operators, and a total operator cost. It is appreciated that more, less, or other query features may be extracted from an historical database and included in a query plan vector.

Historical query vector determiner 222 determines a system load vector from database load information and the application of the database load information to a selected group of query features. This use of database load information by historical query vector determiner 222 has been previously described. As previously described, historical query vector determiner 222 determines a feature vector from attributes of the system load vector and the query plan vector.

At 430 of flow diagram 400, in one embodiment, machine learning is used to build the prediction of query runtime tree. The machine learning builds a PQR tree such that node elements and leaf elements of the PQR tree correspond to query execution runtime ranges associated with sets of the historical database queries that are being used to build the PQR tree. For example, in one embodiment, system 200 of FIG. 2 utilizes machine learning module 220 and its components, historical query feature extractor 221, historical query vector determiner 222, and PQR tree builder 223, to automatically build a PQR tree 230 (such as PQR tree 230A shown in FIG. 3).

With reference to PQR tree 230A of FIG. 3, in one embodiment, PQR tree builder 223, groups an historical database query into an element (such as a node element and/or a leaf element) of a binary tree based upon an execution runtime of the historical database query. Thus, for example, all historical database queries that fall within a certain time range, such as two seconds to five seconds to execute, will be grouped together. Information, such as a feature vector for each of such grouped historical database queries, is also stored in the element of the PQR tree. This information facilitates comparison of one or more feature vector attributes of a database query being processed to one or more feature vector attributes of the grouped historical database queries.

At 440 of flow diagram 400, in one embodiment, a classifier function for a node element of the prediction of query runtime tree is developed. This is a continuing part of the machine learning described in conjunction with 430. The classifier is developed from al least one attribute of feature vectors of a set of plurality of historical database queries associated with the node for which the classifier function is being developed. The classifier function selects a branching path for processing an evaluated database query through the PQR tree as part of a process to estimate a loaded execution runtime of the database query.

For example, through training on the feature vector attributes of node 303, PQR tree builder 223 develops a feature vector based classifier function and stores it within node 303. Numerous techniques for automated training on such a set of attributes may be used. A simple example of such a classifier function which may be stored in node 303 is as follows: "if a processed database query has a stretched cost of greater than 65, then branch to leaf 309, otherwise proceed to leaf 307." Such a classifier function is implemented as rule that comprises a one step binary tree. It is appreciated that numerous classifier functions may comprise much larger binary trees which are stored in node elements of a PQR tree, such as PQR tree 203A.

PQR tree builder 223 may express such a branching rule, or classifier function, in many ways within a node of a PQR tree. For example, in one embodiment, such a classifier function may be incorporated in a logistic regression function used for determining a binary branching path from a node. In another embodiment, such a classifier function may be incorporated into a binary decision tree for determining a branching path from a node. It is appreciated that a node may possess one such feature vector based classifier function or a plurality of such feature vector based classifier functions which are together utilized to determine a branching path for a database query being processed through a PQR tree. It is also appreciated that other classifiers besides these examples may be utilized within a node of a PQR tree.

TABLE 2

Procedure "P1" for Constructing an Element of a PQR Tree

1. Take all the queries in a training example set E of historical database queries, and arrange them in ascending order execution runtime.
2. Compute the deltas (time gaps in this list):

$\delta_{i+1} = \dfrac{T_{i+1} - T_i}{T_i}$, where T is the execution runtime of the $i^{th}$ query.

3. Obtain a set of $\Delta$ of $n_{gap}$ largest $\delta_i$, skipping $n_{skip}$ values from beginning and end of the series of gap values.
4. For each $\delta_i \in \Delta$, divide the query set into two subsets. These are the two classes.
5. Fix a set of classifiers F. For every classifier $f \in F$, train f to detect the two classes of queries obtained from every $\delta_i \in \Delta$ described in step 4. Compute the accuracy for each such prediction.
6. Choose the classifier f and the time range as the combination that gives the highest value of accuracy in step 5.

In one embodiment, while building a prediction of query runtime tree from historical query information, PQR tree builder 223 groups one or more historical database queries of the historical query information into an element of a binary tree based upon an execution runtime of the one or more historical database query. This grouping into an element is based upon application of a procedure, P1, which affects the split of a broader time interval (the range of time between the execution runtime of the shortest historical database query to the longest execution runtime for an historical database query) into two or more narrower time intervals. Table 2 outlines procedure P1.

For example, following this procedure, a starting set of execution runtimes such as {0, 1, 1, 2, 2, 3, 5, 5, 8, 9, 10, 11, 12 14, 15, 16} could be split into two smaller sets, a first set {0, 1, 1, 2, 2, 4, 5, 5}, which is a natural clustering of smaller execution runtimes, and a second set {8, 9, 10, 11, 12 14, 15, 16}, which is a natural clustering of larger execution runtimes. Several other time splits could be made as well, and it is apparent that with larger sets of execution runtimes, there will typically be more opportunities for time splits which group smaller execution runtime and larger execution runtime queries into two sets. As an example, another split of the starting set is a third set {0, 1, 1, 2, 2, 3} of smaller execution runtimes, and a fourth set {5, 5, 8, 9, 10, 11, 12 14, 15, 16} of larger execution runtimes. In one embodiment, the number of time splits made is limited, such as to the five best time splits that split the starting set into smaller sets containing at least 25% of the initial set and not more that 75% of the initial set. Other spitting rules are possible and anticipated. In such a manner a plurality of time splits is created for the set of execution runtimes.

Following procedure P1, automated training is performed on the attributes of feature vectors of the historical database queries of each smaller set. For each of the various splits (for example 5 splits) different classifier functions are trained using classification techniques such as Nearest Neighbor (the 1-nearest neighbor and 3-nearest neighbor classifiers) and Classification Tree (e.g., the c4.5 algorithm). The training involves applying the classifier functions to see how well accurately they divide historical queries into their associated time splits. For example, each time split/classification function may receive a score such as a percentage of correctly classified historical database queries of a total training set of historical database queries evaluated by the time split/classification function combination.

In accordance with procedure P1, after PQR tree builder 223 trains the classifier functions for each of the splits, their effectiveness is evaluated to in association with the time splits. For example, the percentages of successful classification for each of the time split/classification function combinations may be compared to determiner which is highest (best). Based upon the evaluation, the best combination of a classifier function and a time split is selected to become the time split used in an element of the PQR tree, and the classifier function used by the element to determine the time spilt. Thus in one example, the first and second set shown above may be evaluated as the best split choice with a classifier function of "stretched bushiness >17?". As an example, the historical database queries associated with the starting set of execution runtimes (shown above) is stored in node 301 of PQR tree 230A, along with the classifier function for splitting this starting set into the first and second sets (shown above). Additionally, the time range of 0-16 seconds is associated with node 301. The historical database queries associated with the first set are stored in node 303, and the time range of 0-5 seconds is associated with node 303. Similarly the historical database queries associated with the second set are stored in node 305, and the time range 5-16 seconds is associated with node 305. Thus according to the classifier function, if an evaluated database query has a stretched bushiness >16, it will branch to node 305 for further processing by PQR tree 230A, otherwise it will branch to node 303 for further processing by PQR tree 230A.

With reference again to 430 of flow diagram 400, PQR tree builder 223 follows a second procedure, P2, for building out an entire PQR tree. This procedure is shown in Table 3. Procedure P2 creates a root node and classifier function along with two children, and continues to build out the PQR tree by creating a new classifier and children from each child node until a pre-defined termination condition occurs.

TABLE 3

Procedure "P2" for Building a PQR Tree

1. Start at the root node
2. In the root node, take in all the historical queries that will be used in building the PQR tree. Apply procedure P1. This gives a classifier for the node and the time ranges for two child nodes of the node. For each child node apply procedure P1 on all the historical database queries of the child node, getting a classifier and children's time ranges.
3. Recursively apply step 2 until a termination condition is reached.

With reference again to 430 of flow diagram 400, PQR tree builder 223 follows a second procedure, P2, for building out an entire PQR tree. This procedure is shown in Table 3. Procedure P2 creates a root node and classifier function along with two children, and continues to build out the PQR tree by creating a new classifier and children from each child node until a pre-defined termination condition occurs.

PQR tree builder 223 terminates construction of an element of the PQR tree based upon occurrence of a pre-defined termination condition. Some examples of pre-defined termination conditions include, but are not limited to: dropping below a predetermined time range threshold for an element (e.g., $t_{ua}$ to $t_{ub}$<7 seconds); dropping below a predetermined threshold number of historical database queries grouped in an element (e.g., less than 25); and dropping below a predetermined accuracy of runtime estimation for an element (e.g., less than 0.8).

For example, in one embodiment, PQR tree builder 223 terminates construction of a particular element of a PQR tree based upon occurrence of a pre-defined termination condition. Thus, if the number of grouped historical database queries threshold was set at 20, building would cease upon the occurrence of just 19 historical database queries being available to store in a new leaf node of PQR tree 230A. Another example of a termination condition is when the time range threshold for an element drops below a certain pre-determined time range threshold. For example, if a pre-determined threshold of 5 seconds was established as a termination condition, leaf 307 and leaf 309 of PQR tree 230A would not be built. Yet another example of a termination condition is when the accuracy of estimation of execution runtime falls below a predetermined accuracy of time estimation for an element. Thus, for example, if the accuracy cut-off was established at 83%, leaf 307 and leaf 309 of PQR tree 230A would not be built.

As previously indicated, PQR tree 230A represents a database query time estimator solution set for a given database system, based upon a given set of historical database information. Consider, for example, a given set of historical information related to 100 historical database queries. In one embodiment, machine learning module 220 would parse a certain number (an Example set) of the historical database queries such as 80%, to build PQR tree 230A. The remaining historical database queries, 20% in this example, would be used as a test set to perform testing upon PQR tree 230A to determine how accurately it operates to estimate loaded database query execution runtimes. This is a mechanism for building a PQR tree and then validating its operation prior to its first actual use. Thus, if issues are found based upon processing the test set, they can be corrected or addressed prior to using the PQR tree to process a non-historical database query.

As can be seen, each node (301, 303, 305) and leaf (307, 309, 311, 313) of PQR tree 230A represents a time range. For example initial node 301 represents a time range of zero to sixteen seconds. Subsequent elements (nodes and leaves) below initial node 301 further subdivide portions of this time range. It is appreciated that a PQR tree, such as PQR tree 230A is obtained a-priori by applying machine learning to data collected during normal runs on a database system, and can be updated as and when desired. As previously described, collected historical query information and load information (in the form of a feature vector attributes) are used to define the classifier functions in the PQR tree.

Additionally, as can be seen in FIG. 3, each node of PQR tree 230A utilizes a particular manner to express a feature vector based rule, or classifier, for a database query being classified. Thus, in one embodiment, building a PQR tree from historical query information comprises including a decision making function, such as a classifier function, in a node element of the PQR tree. Such a decision making function is for classifying a database query into one of two leaves coupled with a particular node. For example, node 305 of PQR tree 230A uses logistic regression function used for determining a binary branching path from node 305 to either leaf 311 or leaf 313; node 301 uses a binary decision tree for determining a branching path to either node 303 or node 305; and node 303 uses a binary decision tree to determine a branching path to leaf 307 or leaf 309. It is appreciated that a node may posses one such feature vector based rule or a plurality of such feature vector based rules, which are together, are used to determine a branching path for a database query being processed through a PQR tree.

Moreover, based upon practice with historical database queries from the set of historical database information, each node is associated with an accuracy level. In PQR tree 230A, this is expressed as a percentage, associated with how accurately the historical database queries of the set comply with the time range associated with the node when the historical database queries utilized to build PQR tree 230A are later processed through PQR tree 230A. Thus, as shown in FIG. 3, an accuracy of 90% is associated with node 301, an accuracy of 82% is associated with node 303, and an accuracy of 85% is associated with node 305.

Estimating a Loaded Execution Runtime of a Database Query

FIG. 5 is a flow diagram 500 of a method, according to one embodiment, for estimating a loaded execution runtime of database query. Reference will be made to FIG. 2 and to FIG. 3 in the explanation of flow diagram 500.

At 510 of flow diagram 500, in one embodiment, a database query is received. Additionally, in some embodiments, this comprises receiving a database query and/or query plan information corresponding to the database query. For example, with reference to system 200, this comprises database query receiver 240 receiving a database query for which a loaded execution runtime will be estimated. As previously described, this may additionally include receiving a query plan associated with the database query. It is appreciated that the received database query is a query for the database system for which a PQR tree, such as PQR tree 230A (FIG. 3) has been built.

At 520 of flow diagram 500, in one embodiment, load information is received for the database upon which the query will be (or is anticipated to be) executed. The database is loaded, that is, the database is executing one or more additional queries and their corresponding processes. Some examples of this load information are an MPL of the database (number of queries being executed or anticipated at some particular time when the evaluated query is executed) and the number of processes running on the database. For example, with reference to system 200, this comprises database load information receiver 245 receiving such database load information for a database upon which the received database query will be (or is anticipated to be) executed.

At 530 of flow diagram 500, in one embodiment, a prediction of query runtime tree is accessed. The PQR tree is built from historical query information regarding historical database queries previously executed on the database. The PQR tree includes a classifier function that is adjusted for an historical impact of loading of the database. An example of this is a classifier function that is based upon or has been trained from one or more load vector attributes derived from feature vectors of historical database queries executed on the database. Such classifier functions have been previously described. In one embodiment, for example, this comprises accessing a PQR tree built using the method described in flow diagram 400 of FIG. 4. With reference to system 200, in one embodiment, this comprises tree traverser 250 accessing a root node of a binary tree, such as PQR tree 230 (or 230A of FIG. 3). Node 301 of PQR tree 230A is an example of a root node. This root node, or initial node, corresponds to an overall range of historical execution runtimes associated with a plurality of historical database queries of the historical query information.

At 540 of flow diagram 500, in one embodiment, the received database query is processed through the prediction of query runtime tree, such that a loaded execution runtime of the database query is estimated based upon information pertaining to historical database queries similar to the database query.

As part of processing the received database query through a PQR tree, in one embodiment, one or more query features are extracted from the query. Typically, this involves extracting a plurality of query features. In one embodiment, this comprises tree traverser 250 utilizing query feature extractor 255 to extract one or more pre-identified query features. A non-limiting list of some such query features includes: a measure of bushiness, a measure of disk partition parallelism, a total input/output cardinality, an input/output cost, a measure of process parallelism, a total join cardinality, a non-input/output cost, a total number of inputs/outputs, a total number of joins, a total number of probes, a total number of sorts, a total cardinality of sorts, a total number of tables, an optimizer cost, a total estimated cardinality, a total number of operators, and a total operator cost.

Tree traverser 250 traverses the PQR tree based upon successive classification of the received database query according to a classifier function (or rule(s) at each node of the PQR tree. As previously described, such classifier function(s) are trained from and based upon feature vector attributes of historical database queries that are grouped into a set at a particular node. The classifier function may be embodied as a binary tree, logistic regression, or some other form of classifier function. This allows the determination of branching paths while traversing a PQR tree to process a received database query. Thus, in this manner, the PQR tree is traversed on the basis of at least one query feature associated with the received database query.

Query vector determiner 257 determines a query plan vector from one or more extracted features. In one example, a query plan vector for a received query is comprised of one or more of the above recited query features.

Query vector determiner 257 also determines a system load vector for the database query. The system load is vector based on the received load information and selected query features extracted from the database query. For example, as described above, by combining (such as through multiplication) MPL information and data regarding a total number of executing processes, stretched versions of all or selected query features are created.

Query vector determiner 257 also determines a feature vector for the received database query. The feature vector is comprised of all or selected attributes of the query plan vector and the system load vector. For purposes of brevity and clarity, reference is made to the previously described example of a feature vector.

Tree traverser 250 then traverses the prediction of query runtime tree on the basis of one or more attributes of the feature vector associated with the database query. Through such traversing, the received database query is successively classified and directed through the PQR tree until ultimately the received database query is classified to a particular leaf of the PQR tree. This allows for determining an estimate of the loaded execution runtime in the form of a time range estimate of loaded execution runtime that is based upon a similarity of at least one attribute of the query vector to a classifier function derived from a grouping of historical database queries stored in an element of the prediction of query runtime tree.

Consider for example, an embodiment where, based upon some similarity, the received database query is ultimately classified to leaf 313 of PQR tree 230A. In such an embodiment, the estimated loaded execution runtime range has been successively narrowed from a very broad loaded execution runtime range associated with node 301 (0-16 seconds), to a narrower estimated loaded execution runtime range associated with node 305 (5-16 seconds), and finally to an even narrower loaded execution runtime range of associated with leaf 313 (7-16 seconds). The estimated loaded execution runtime range of seven to sixteen seconds associated with leaf 313 provides an estimate of the loaded execution runtime of the received database query, which has been successively narrowed by further traversing of PQR tree 230A. In some embodiments, such traversing could stop at node 305 or even at node 301 rather than proceeding to leaf 313, thus resulting in a broader time range estimate.

In one embodiment, an estimated loaded execution runtime range is then output to a user, for example on a display device, such as display device 118 (FIG. 1). In other embodiments, this estimated loaded execution runtime range estimate is output for some other use, such as, for example to be used by another process or by a portion of a database system.

Although the subject matter of the present technology for estimating a loaded execution runtime of a database query has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for estimating a loaded execution runtime of database query, said method comprising:
   receiving a database query for a database;
   receiving load information for said database, said database being loaded; accessing a prediction of query runtime tree built from historical query information regarding historical database queries previously executed on said database, said prediction of query runtime tree including a classifier function adjusted for an historical impact of loading of said database, said query runtime tree comprising a plurality of nodes, said classifier function for determining at least one branching path from at least one node of said plurality of nodes; and
   processing said database query through said prediction of query runtime tree, such that a loaded execution runtime of said database query is estimated based upon information pertaining to historical database queries similar to said database query.

2. The method as recited in claim 1, wherein said accessing a prediction of query runtime tree built from historical query information regarding historical database queries previously executed on said database comprises:
   accessing a root node of a binary tree, said root node corresponding to an overall range of historical execution runtimes associated with a plurality of historical database queries of said historical query information.

3. The method as recited in claim 1, wherein said processing said database query through said prediction of query runtime tree further comprises:
   extracting a plurality of query features from said database query.

4. The method as recited in claim 3, further comprising:
   determining a query plan vector for said database query from said plurality of query features.

5. The method as recited in claim 4, wherein said determining a query plan vector for said database query from said plurality of query features comprises:
   determining a query plan vector comprising one or more query features, selected from the group of query features consisting of: a measure of bushiness, a measure of disk partition parallelism, a total input/output cardinality, an input/output cost, a measure of process parallelism, a total join cardinality, a non-input/output cost, a total number of inputs/outputs, a total number of joins, a total number of probes, a total number of sorts, a total cardinality of sorts, a total number of tables, an optimizer cost, a total estimated cardinality, a total number of operators, and a total operator cost.

6. The method as recited in claim 4, further comprising:
   determining a system load vector for said database query, said system load vector based on said load information and selected query features extracted from said database query.

7. The method as recited in claim 6, further comprising:
   determining a feature vector for said database query, said feature vector comprised of attributes of said query plan vector and said system load vector.

8. The method as recited in claim 1, wherein said processing said database query through said prediction of query runtime tree further comprises:
   traversing said prediction of query runtime tree on the basis of one or more attributes of a feature vector associated with said database query.

9. The method as recited in claim 8, further comprising:
   determining a time range estimate of said loaded execution runtime based upon a similarity of said at least one attribute of said query vector to a classifier function derived from a grouping of historical database queries stored in an element of said prediction of query runtime tree.

10. The method of claim 1, wherein said accessing a prediction of query runtime tree built from historical query information regarding historical database queries previously executed on said database comprises:
    accessing a prediction of query runtime tree built by a method comprising:
      receiving historical query information regarding a group of historical database queries previously executed on a loaded database;
      determining feature vectors for a plurality of said historical database queries, such that said feature vectors comprise load attributes related to the impact of database load upon said plurality of historical database queries;
      using machine learning to build said prediction of query runtime tree, such that node elements and leaf elements of said prediction of query runtime tree correspond to query execution runtime ranges associated with sets of said plurality of historical database queries; and
      developing a classifier function for a node element of said prediction of query runtime tree, said classifier function developed from at least one attribute of feature vectors of a set of said plurality of historical database queries associated with said node, said classifier function configured for selecting a branching path for processing a database query through said prediction of query runtime tree to estimate a loaded execution runtime of said database query.

11. The method as recited in claim 10 wherein said determining feature vectors for a plurality of historical database queries from said group of historical database queries further comprises:
    extracting historical query features from an historical database query of said plurality of historical database queries; and
    utilizing a plurality of said historical query features to develop a query plan vector for said historical query.

12. The method as recited in claim 11, wherein said utilizing a plurality of said historical query features to develop a query plan vector for said historical query comprises:
    utilizing a plurality of said historical query features selected from the group of historical query features consisting of: a measure of bushiness, a measure of disk partition parallelism, a total input/output cardinality, an input/output cost, a measure of process parallelism, a total join cardinality, a non-input/output cost, a total number of inputs/outputs, a total number of joins, a total number of probes, a total number of sorts, a total cardinality of sorts, a total number of tables, an optimizer cost, a total estimated cardinality, a total number of operators, and a total operator cost.

13. The method as recited in claim 11, further comprising:
    utilizing database load information regarding execution of said historical database query and a set of said historical query features to determine a system load vector for said historical query.

14. The method as recited in claim 10, wherein said using machine learning to build said prediction of query runtime tree further comprises:

terminating construction of an element of said prediction of query runtime tree based upon occurrence of a pre-defined termination condition.

15. The method as recited in claim 14, wherein said terminating construction of an element of said prediction of query runtime tree based upon occurrence of a pre-defined termination condition comprises:

terminating construction of said element upon occurrence of a pre-defined termination condition selected from the group of termination conditions consisting of:

dropping below a predetermined time range threshold for said element; dropping below a predetermined threshold number of historical database queries grouped in said element; and dropping below a predetermined accuracy of runtime estimation for said element.

16. The method as recited in claim 10, wherein said developing a classifier function for a node element of said prediction of query runtime tree comprises developing said classifier function by:

trying out a plurality of time splits for a set of execution runtimes associated with said plurality of said historical database queries;

evaluating at least one classifier function in association with each of said time splits; and based upon said evaluating, select a best performing classifier function and time split combination as said classifier function and as a time split used in said node.

17. A computer-readable storage medium having computer-readable code stored thereon for causing a device to perform a method of estimating a loaded execution runtime of a database query, said method comprising:

receiving a database query to be executed on a database at a query receiver;

receiving load information related to a load of said database at a database load information receiver;

processing said database query through a prediction of query runtime tree to estimate a loaded execution runtime for executing said query upon said database at a tree traverser coupled with said query receiver and said database load information receiver, said query runtime tree comprising a plurality of nodes and at least one branching path between two nodes of said plurality of nodes;

receiving historical query information related to historical database queries previously executed on said database at an historical query information receiver; and developing a loaded database query execution runtime classifier function from said historical query information, such that said classifier function is embodied within a prediction of query runtime tree at a machine learning module coupled with said historical query information receiver, said classifier function for determining said at least one branching path from at least one node of said plurality of nodes.

18. The computer-readable storage medium of claim 17, wherein developing a loaded database query execution runtime classifier function from said historical query information comprises:

extracting at least one historical query feature related to an historical database query of said historical query information at an historical query feature extractor;

determining a query plan vector and a system load vector for said historical database query at an historical query vector determiner coupled with said historical query feature extractor; and grouping a plurality of historical database queries of said historical database information into node and leaf elements of said prediction of query runtime tree at a prediction of query runtime tree builder coupled with said historical vector determiner, said grouping based upon execution runtimes of said historical database queries.

19. The computer-readable storage medium of claim 17, wherein said processing said database query through a prediction of query runtime tree to estimate a loaded execution runtime for executing said query upon said database comprises:

extracting one or more features of said database query at a query feature extractor; and determining a query plan vector and a system load vector for said database query at a query vector determiner coupled to said query feature extractor.

* * * * *